E. I. DODDS.
STAY BOLT.
APPLICATION FILED APR. 18, 1914.

1,146,482.

Patented July 13, 1915.

3 SHEETS—SHEET 1.

WITNESSES
R A Balderson
G. B. Bleming

INVENTOR
Ethan I. Dodds

COLUMBIA PLANOGRAPH CO., WASHINGTON, D. C.

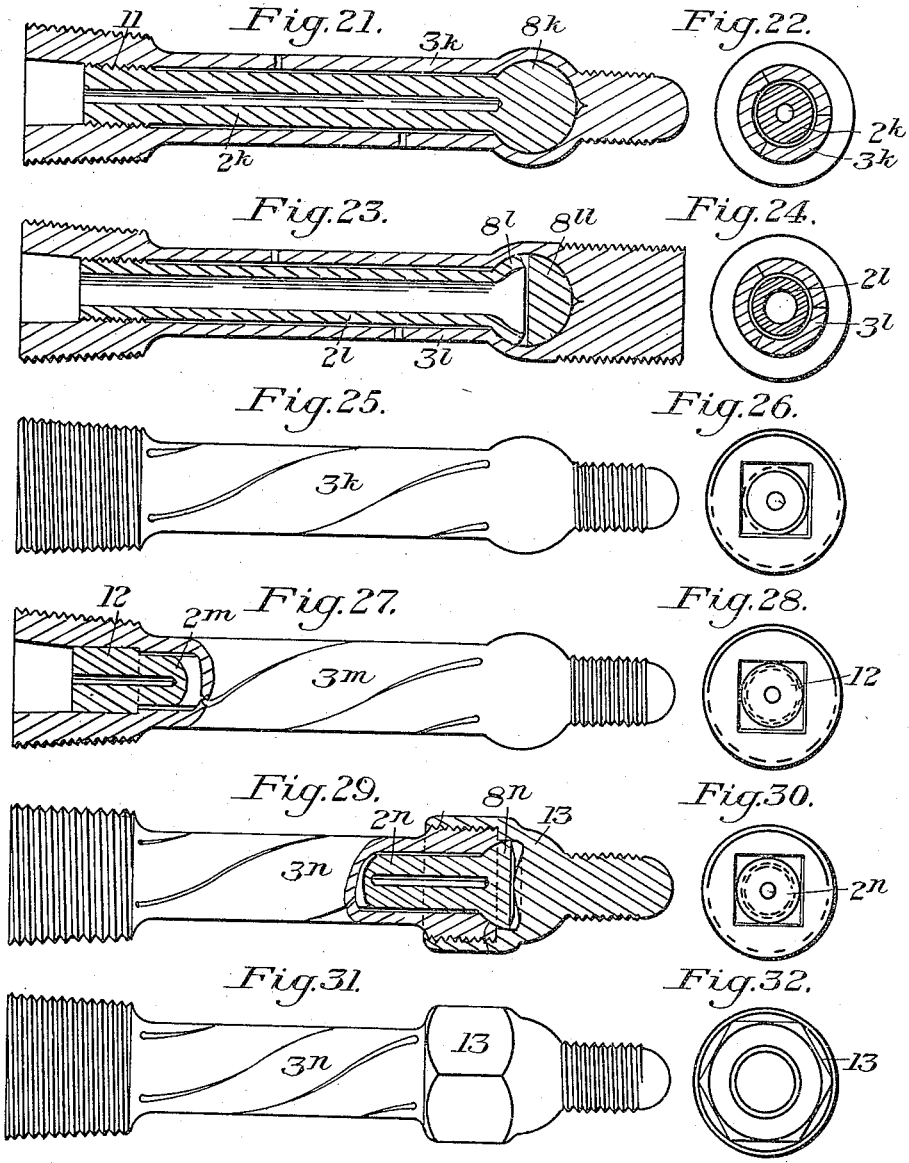

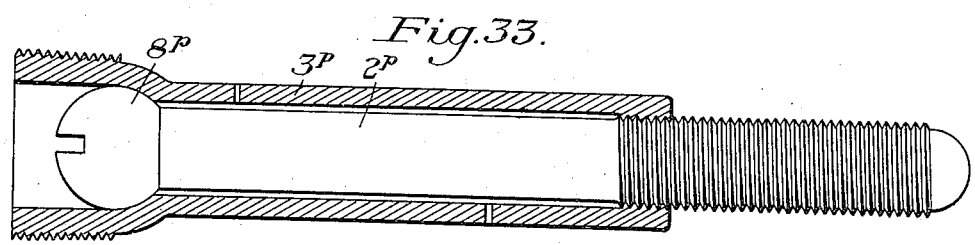
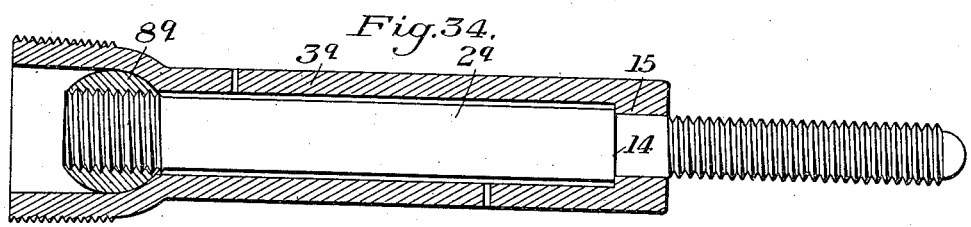
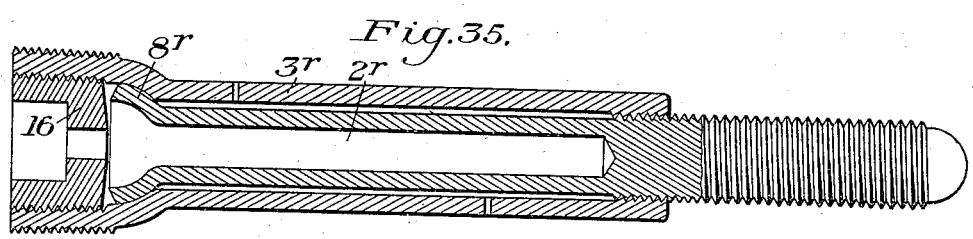
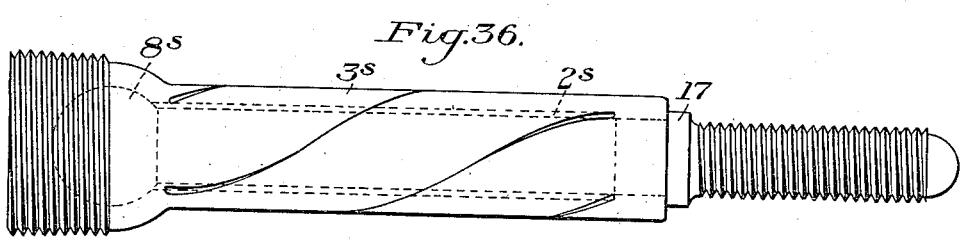
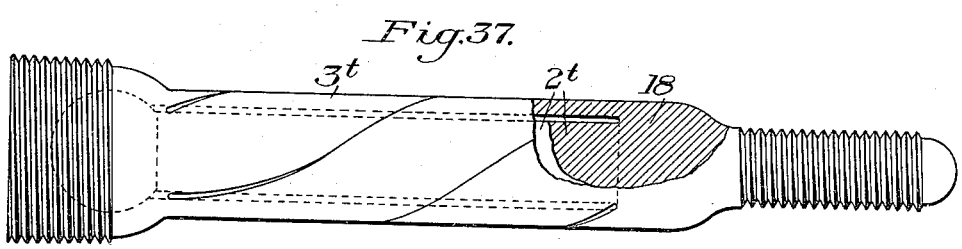

UNITED STATES PATENT OFFICE.

ETHAN I. DODDS, OF ZELIENOPLE, PENNSYLVANIA, ASSIGNOR TO KERNER MANUFACTURING COMPANY, OF PITTSBURGH, PENNSYLVANIA, A CORPORATION OF PENNSYLVANIA.

STAY-BOLT.

1,146,482.   Specification of Letters Patent.   Patented July 13, 1915.

Application filed April 18, 1914.   Serial No. 832,746.

*To all whom it may concern:*

Be it known that I, ETHAN I. DODDS, a citizen of the United States, and a resident of Zelienople, in the county of Butler and State of Pennsylvania, have invented certain new and useful Improvements in Stay-Bolts, of which the following is a full, clear, and exact description, reference being had to the accompanying drawings, forming part of this specification, in which—

Figure 1:
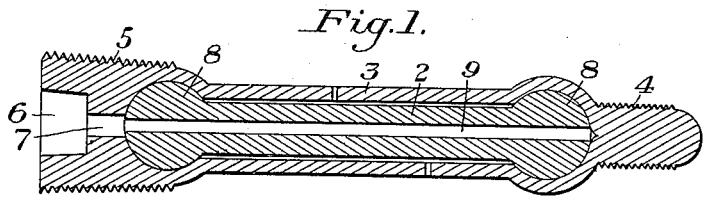
Figure 2:
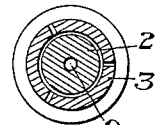
Figure 3:
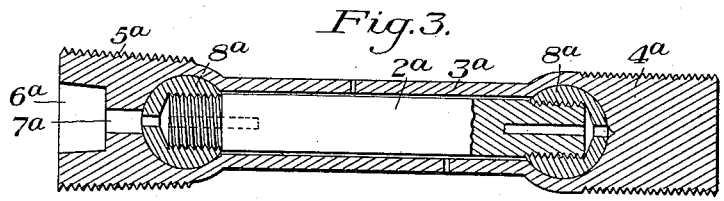
Figure 4:
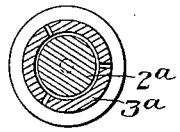
Figure 5:
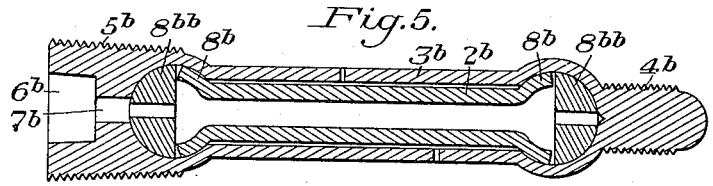
Figure 6:
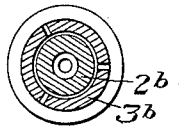
Figure 7:
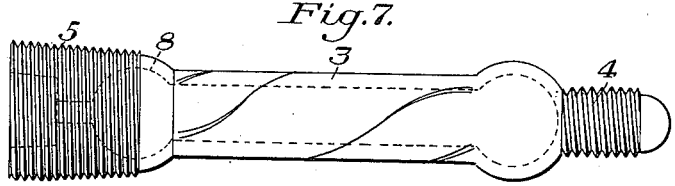
Figure 8:
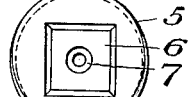
Figure 9:
Figure 10:
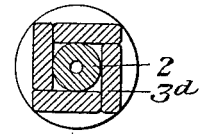

Figure 1 is a longitudinal section of one form of my improved bolt; Fig. 2 is a section through the body thereof; Fig. 3 is a view similar to Fig. 1, showing a modified form of bolt; Fig. 4 is a sectional view through the body of the bolt shown in Fig. 3; Fig. 5 is a view similar to Fig. 1, showing another modified form of bolt; Fig. 6 is a sectional view through the body of the bolt shown in Fig. 5; Fig. 7 is a side elevation of the bolts shown in Figs. 1 to 6; Fig. 8 is an end view thereof; Fig. 9 is a side elevation of another form of bolt; Fig. 10 is a sectional view through the body thereof; Figs. 11, 12, 13, 14, 15, 16, 17, 18, 19 and 20 are views similar to Fig. 10, showing other modified forms of bolts; Fig. 21 is a longitudinal section of still another form of bolt; Fig. 22 is a sectional view through the body thereof; Fig. 23 is a view similar to Fig. 21 of another form of bolt; Fig. 24 is a sectional view through the body portion of the bolt shown in Fig. 23; Fig. 25 is a side elevation of another form of bolt; Fig. 26 is an end view thereof; Figs. 27 and 29 are side elevations partially in section of other forms of bolts; Figs. 28 and 30 are end views of the bolts shown in Figs. 27 and 29, respectively. Fig. 31 is a side elevation of another form of bolt; Fig. 32 is an end view thereof; Figs. 33, 34 and 35 are side elevations partially in section of other forms of bolts; Fig. 36 is a side elevation of another form of bolt; and Fig. 37 is a side elevation partially in section of still another form of bolt.

This invention relates to an improvement in stay bolts, and is designed to provide an efficient bolt of this character having a body portion composed of inner and outer separate members which are connected to each other at least at one end by means of a ball and socket connection so that one member can flex relatively to the other.

The precise nature of my invention will be best understood by reference to the accompanying drawings, which will now be described, it being premised, however, that various changes may be made in the construction of the bolt without departing from the spirit and scope of my invention as defined in the appended claims.

All of the bolts shown in the accompanying drawings comprise an inner member 2 and an outer tubular member 3, which may be connected to each other in various ways, but in all cases the members are connected to each other at least at one end by means of a ball and socket connection as hereinafter described, and in all cases the outer or tubular member is slotted between its ends and twisted about the axis of the body of the bolt in order to permit said member to flex under strains. In Fig. 1 the outer member is provided with a screw-threaded portion at one end as indicated at 4, which may be of reduced diameter, or if desired may be of a diameter equal to the largest portion of the bolt. The other end of the tubular member 3 is provided with a screw-threaded portion 5, the diameter of the bottom of the threads being greater than the outer diameter of the largest portion of the bolt. This end of the outer or tubular member 3 is also provided with a wrench socket 6 and a telltale hole 7. The inner member 2 is provided with spherical heads 8 at each end thereof, each of which is seated in a spherical socket in the ends of the outer member 3. This bolt may be made in any desired manner, but I prefer to form it by taking a blank having a bore approximately the diameter of the largest portions of the heads, forming the end member 4, then slitting the blank, then inserting the body member 2 and twisting the body member 3 about the member 2, which will close up the body portion 3 about the central portion of the body portion 2 between the heads 8. The screw-threaded end 5 may then be formed in any desired manner so that the inner member 2 is entirely incased within the body member 3. If desired the inner member 2 may be provided with a through opening 9 which is arranged to permit steam to pass out through the telltale hole if the inner member should be broken.

In Figs. 3 and 4 I have shown a construction similar to that shown in Figs. 1 and 2, and have indicated the several parts with the same reference characters with the letter "a" affixed. In this case the body 2ª is provided with spherical heads 8ª having screw threaded connections with screw-threaded portions on the ends of the body member 2ª. These heads 8ª may be provided with telltale holes, one of which is arranged to register with said telltale hole 7ª.

In Figs. 5 and 6 I have applied the same reference characters with the letter "b" affixed, and in which case the body 2ᵇ is formed of a tubular member. One half of the head 8ᵇ on each end thereof is formed by swelling at the end of the body member 2ᵇ, while the other half of each end is formed of a semi-spherical member 8ᵇᵇ.

In Figs. 9 and 10, I have shown a bolt which may be provided with a body portion 2, such as shown in Figs. 1, 3 and 5, the body portion 3ᵈ being formed from a square tube slotted at four points on a line with each of the inner walls of the tube.

Figure 11:
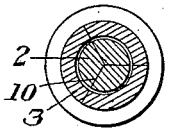
Figure 12:
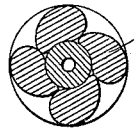
Figure 13:
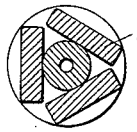
Figure 14:
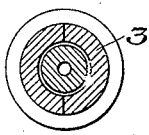
Figure 15:
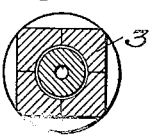
Figure 16:
Figure 17:
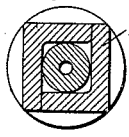

In Fig. 11 I have shown a construction such as shown in Figs. 1 and 2, but in this case the body 2 is slotted as indicated at 10.

In Figs. 12 to 17, I have shown bolts which may be provided with inner members 2, such as shown in Fig. 1, but in which case the outer members 3ᶜ are formed from tubes of different shapes.

Figure 18:
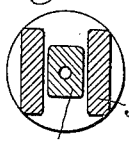

In Fig. 18, I have shown a bolt in which the inner or body portion 2ᵍ is of rectangular form, while the outer body portion 3ᵍ is provided with cut-away portions diametrically opposite to each other.

Figure 19:
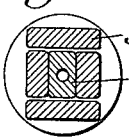

In Fig. 19, I have shown an inner body portion 2ʰ similar to that shown in Fig. 18, while the outer body portion 3ʰ is similar to that shown in Fig. 10.

Figure 20:
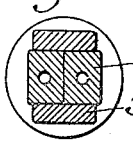

In Fig. 20, the outer body portion 3ʲ is similar to that shown in Fig. 18, while the inner body portion 2ʲ is formed of a plurality of rectangular members.

In all of the above described bolts, the inner member is provided with a plurality of spherical heads which seat in sockets in the ends of the outer members or body portions.

In Fig. 21, I have shown a bolt in which the body portion 2ᵏ is provided with a spherical head 8ᵏ at one end which is seated in a socket in one end of the body portion 3ᵏ, the other end being provided with a screw-threaded portion 11 in engagement with a screw-threaded portion in the other end of the body 3ᵏ.

In Fig. 23, I have shown a construction similar to that shown in Fig. 21, and in which case I have shown a spherical head 8ˡˡ similar to that shown in Fig. 5.

In Fig. 27, I have shown a construction similar to that shown in Fig. 21, but in this case the body portion 2ᵐ is provided with a shouldered head 12 seated in a shoulder socket in one end of the body portion 3ᵐ.

In Fig. 29, the body portion 2ⁿ may be provided with any form of head at the left hand end thereof, while the other end is provided with a semispherical head 8ⁿ seated in a round socket in the end of the body 3ⁿ. This end of the body 3ⁿ is provided with external screw threads which are engaged by a recessed nut 13 which engages the end of the head 8ⁿ.

In Fig. 33, the body portion 2ᵖ is provided with a spherical head 8ᵖ at one end, which is seated in a socket in one end of the body 3ᵖ. The head 8ᵖ may be provided with a slot for a wrench or screw driver. The other end of the body 2ᵖ has screw threaded engagement with the end of the body 3ᵖ.

In Fig. 34, the body portion 2ᵠ is provided with a removable head 8ᵠ. This body portion 2ᵠ is also reduced in diameter at one end in order to form a shoulder 14 against which an annular flange 15 on the body portion 3ᵠ is seated.

In Fig. 35, the body portion 2ʳ is hollow at one end and is provided with a flared end portion forming a head 8ʳ, which is seated in a socket in the end of the body 3ʳ, and maintained in position by means of a nut 16 having a screw-threaded engagement with the interior of the socket in the end of the body 3ʳ. The other ends of the member are connected in a manner similar to that shown in Fig. 33.

In Fig. 36, the inner member or body portion 2ˢ is provided with a shoulder 17 which is seated against the outer face of an annular flange on one end of the body portion 2ˢ. The other ends of the body members may be secured to each other in any desired manner.

In Fig. 37, I have shown a construction in which one end of the body portion 2ᵗ is welded to one end of the outer body portion 3ᵗ at 18. The other ends of the members may be secured to each other in any desired manner.

The advantages of my invention result from the provision of a stay bolt formed of inner and outer body members which are connected to each other at least at one end by a universal joint, so that one member can be moved relatively to the other member.

I claim:

1. A stay bolt having internal and external body portions separated from each other through a portion of their length but connected to each other at the ends thereof, the connection at one end comprising a ball and socket joint, the external body portion being twisted about the axis of the bolt; substantially as described.

2. A bolt having an internal body portion and an external body portion, the external body portion having a plurality of separate members in the central portion thereof, said members being twisted helically about the internal body portion, a spherical head on each end of the internal body portion, said spherical heads being seated in spherical recesses in the ends of the external body portion; substantially as described.

3. A bolt having internal and external body portions, spherical heads on the ends of the inner member, the outer member having spherical sockets in which the spherical heads of the inner member are seated, said outer member being slotted between the sockets and twisted about the axis of the bolt; substantially as described.

In testimony whereof, I have hereunto set my hand.

ETHAN I. DODDS.

Witnesses:
 Geo. B. Bleming,
 Jesse B. Heller.

Copies of this patent may be obtained for five cents each, by addressing the "Commissioner of Patents, Washington, D. C."